Sept. 11, 1934.                    C. S. HADDLESAY                    1,972,931
                         TRACK FOR MONORAIL CONVEYER SYSTEMS
                            Original Filed March 10, 1931
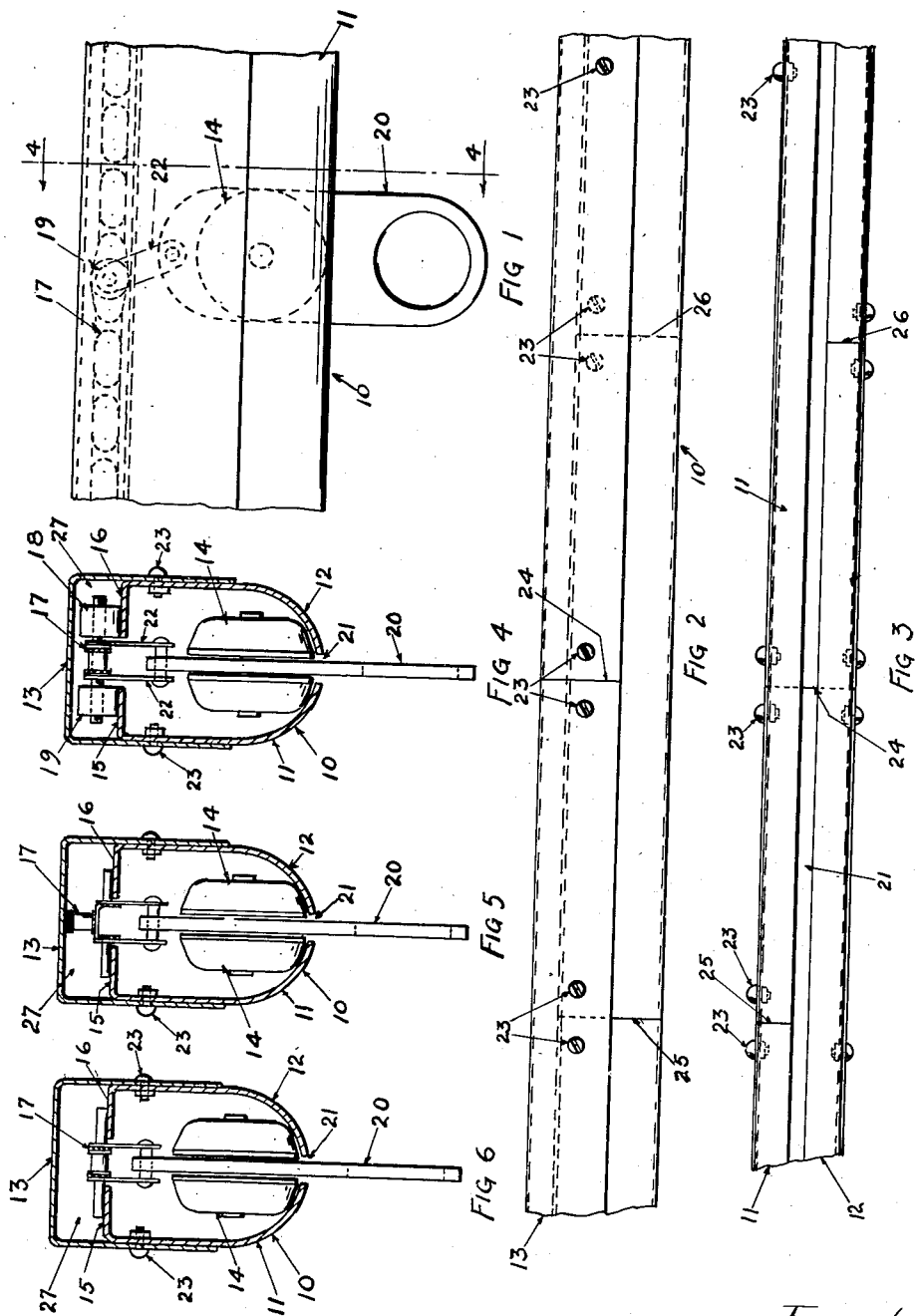
Inventor:
Charles S. Haddlesay Patented Sept. 11, 1934

1,972,931

UNITED STATES PATENT OFFICE 1,972,931

TRACK FOR MONORAIL CONVEYER SYSTEMS

Charles S. Haddlesay, Elmhurst, Ill.

Application March 10, 1931, Serial No. 521,493
Renewed October 16, 1933

3 Claims. (Cl. 104—108)

This invention relates to tracks for monorail conveyer systems where the load is suspended below the track and where the cars or trolleys travel in a slot in the underside of the track.

One of the objects of this invention is to provide a suitable track and guides for cars or trolleys economical in both manufacturing and installing.

A further object is to provide a support and guide for power means for moving cars or trolleys along the track, such as a chain, wire or rope.

A further object is to provide an enclosed track for both cars and driving mechanism as a safety measure for operators.

A further feature of this invention is to provide a means for protecting the contact surface of the track, cars, and driving mechanism from collecting dirt or any foreign material.

Other objects and advantages will hereinafter be more fully described, and for a more complete understanding of the characteristic feature of this invention, reference may now be had to the following description and accompanying drawing, in which latter Figure 1 is a front elevational view of the assembled track embodying the present invention;

Fig. 2 is a side elevational view of the track showing the sections in their assembly;

Fig. 3 is a bottom view of the track as shown in Fig. 2;

Fig. 4 is a transverse sectional view taken on the line 4—4 of Fig. 1;

Fig. 5 is a transverse sectional view similar to Fig. 4, showing a modified form of the driving chain.

Fig. 6 is a transverse sectional view similar to Fig. 4, showing a modified form of the chain and guiding member.

Referring to the drawing in detail, the embodiment illustrated comprises a horizontal track 10, which is built up of three separate sections 11, 12, and 13, each section being removable. Side members 11 and 12 form the track or rail for the car member 14, the upper edge of the side members 11 and 12 being bent over horizontally to form a ledge or guide rail 15 and 16. The ledges 15 and 16 support a chain or trolley 17. The chain 17 gets its power from a vertical driving sprocket and is suspended on the guide rails 15 and 16 by anti-friction rollers 18 and 19.

A yoke 20 is carried by the car member 14, and extends downwardly through the track or rail members 11 and 12. The rail members 11 and 12 provide an opening 21 at the bottom of the track to act as a guide for the yoke 20. The upper end of the yoke 20 is pivoted to links 22, which are pivoted to the chain 17 to provide a connection from the power chain to the yoke.

A top member or support section 13 is bent down vertically and is fastened to the side rails by bolts 23.

Referring now to Figs. 2 and 3, Fig. 2 shows the sections 11, 12, and 13 spliced together, the top member or supporting section 13 being spliced at 24. The side member 11 is spliced at 25, and the side member 12 is spliced at 26.

Fig. 3 shows the section in which no two of the three sections are spliced at the same point.

In the modification shown in Fig. 5 the construction is the same as in Fig. 4 except that the driving chain 17 is designed for use with a horizontally disposed sprocket wheel.

In the modification shown in Fig. 6 the construction is the same as in Fig. 4 except that the anti-friction rolls are removed.

Space 27 may be used for attaching adjuncts such as car-stopping mechanism in gravity lines.

While only one specific embodiment of the present invention has been shown and described herein, it will be understood that various changes and modifications in the details of structure and arrangement of the parts may be made without departing from the spirit and scope of the invention. This embodiment of the invention having been shown and described, therefore, what is claimed as new is:

1. A monorail conveyer system comprising a flexible conveyer element provided with laterally extending conveyer supporting devices, cars propelled by said conveyer element, and a combined car track and conveyer supporting construction comprising two opposed side channel members and an upper channel member, the flanges of one side member extending toward the flanges of the other side member, but being spaced to provide clearance between the upper flanges and also between the lower flanges, the upper flanges supporting the lateral extensions of the conveyer element and the lower flanges supporting the cars, said upper channel member having its flanges extending downwardly and embracing the side channel members and serving as a housing for the flexible conveyer element.

2. A monorail conveyer system comprising a flexible conveyer element provided with laterally extending conveyer supporting devices, cars propelled by said conveyer element, and a combined car track and conveyer supporting construction comprising two opposed side channel members and an upper channel member, the flanges of one side member extending toward the flanges of the other side member, but being spaced to provide clearance between the upper flanges and also between the lower flanges, the upper flanges supporting the lateral extensions of the conveyer element and the lower flanges supporting the cars, said upper channel member having its flanges extending downwardly and embracing the side channel members and serving as a housing for the flexible conveyer element, the ends of each of said sections being staggered lengthwise with respect to the ends of the other sections.

3. A conveyer system comprising a flexible conveyer element provided with spaced laterally extending conveyer supporting devices, cars propelled by said conveyer element, a combined car track and conveyer supporting construction comprising a lower trackway on which the cars run and an upper trackway on the upper surface of which the laterally extending supporting devices are supported for travel, said upper trackway comprising two spaced parallel tracks on opposite sides of said conveyer element, connections from said conveyer elements to said cars extending between said spaced tracks, and a channel-shaped housing member straddling said upper trackway for housing the conveyer element.

CHARLES S. HADDLESAY.